United States Patent [19]
Parvinen et al.

[11] Patent Number: 6,007,722
[45] Date of Patent: Dec. 28, 1999

[54] EXTRACTION METHOD

[75] Inventors: Lasse Parvinen, Tampere; Jukka Salli, Pori, both of Finland

[73] Assignee: Chematur Ecoplanning Oy, Pori, Finland

[21] Appl. No.: 09/051,494

[22] PCT Filed: Oct. 11, 1996

[86] PCT No.: PCT/FI96/00538

§ 371 Date: Jun. 19, 1998

§ 102(e) Date: Jun. 19, 1998

[87] PCT Pub. No.: WO97/13567

PCT Pub. Date: Apr. 17, 1997

[30] Foreign Application Priority Data

Oct. 11, 1995 [FI] Finland ..................................... 954832

[51] Int. Cl.[6] ............................... B01D 11/04; C07C 7/10

[52] U.S. Cl. ........................... 210/634; 210/639; 585/833

[58] Field of Search ..................................... 210/634, 638, 210/639, 908; 208/24, 134; 585/709, 375, 833

[56] References Cited

U.S. PATENT DOCUMENTS

| | | | |
|---|---|---|---|
| 4,798,915 | 1/1989 | Faggian et al. | 585/833 |
| 4,824,570 | 4/1989 | Bethuel et al. | 210/634 |
| 4,827,078 | 5/1989 | Franco et al. | 585/833 |
| 4,843,184 | 6/1989 | Faggian et al. | 585/864 |
| 4,877,530 | 10/1989 | Moses | 210/634 |
| 5,147,538 | 9/1992 | Wright et al. | 210/634 |
| 5,171,448 | 12/1992 | Genova et al. | 210/634 |

FOREIGN PATENT DOCUMENTS 0 422 734 A1  4/1991  WIPO .

OTHER PUBLICATIONS

Corma et al., "Chemistry, Catalysts, and Processes for Isoparaffin–Olefin Alkylation: Actual Situation and Future Trends," 34 *Catal. Rev.–Sci. Eng.* 483–570 (1993).

*Primary Examiner*—Joseph W. Drodge
*Attorney, Agent, or Firm*—Lydon & Brown, LLP

[57] ABSTRACT

An extraction method is disclosed, where organic impurities are removed from a phase essentially containing sulfuric acid, by means of supercritical or liquid carbon dioxide. In particular, the spent sulfuric acid from a process for production of alkylate fuel may be regenerated for re-introduction into the process without incineration.

6 Claims, No Drawings

EXTRACTION METHOD

FIELD OF THE INVENTION

This invention relates to the handling of material in the liquid and supercritical states, and particularly to extraction using a supercritical fluid.

TECHNICAL BACKGROUND

The critical temperature of a material is the highest temperature, at which the material can be liquefied from a gaseous state by raising the pressure. The critical pressure is the pressure required to affect liquefaction at the critical temperature.

A material can be brought to a supercritical state by first raising its pressure above the critical pressure, and then raising the temperature above the critical temperature. The state of a material under supercritical conditions differs both from the liquid and the gaseous state. Hereinafter, reference is made to a supercritical fluid. For example, the solvent characteristics of a supercritical fluid differ from those of the liquid in a normal state. Carbon dioxide in a supercritical state functions as a very efficient organic solvent. The solvent characteristics can be utilized in supercritical extraction. Supercritical fluid is directed through a material in a pressure vessel, whereby components are leached from the material into the fluid. When the pressure of the material is lowered to below the critical pressure, the solvent power of the fluid substantially changes, and dissolved material precipitates. When the liquid is evaporated, all the dissolved material is left in the residue. Supercritical extraction has gained popularity as the use of ordinary solvents has been decreased for environmental and occupational health reasons. Supercritical extraction is suitable for, e.g. separation of environmental toxins from polluted material. The extraction may also be used for separation of aroma components from aromatic herbs.

Supercritical extraction is useful in those cases where the material to be extracted is not reactive towards the supercritical fluid, and where the solubility of some of its components in the supercritical fluid is sufficiently high. As the solubility of organic compounds in the supercritical fluid generally is remarkably higher than that of inorganic compounds, the method has proved practical in the extraction of organic compounds from their mixtures with inorganic material.

By no means, however, is the solvent power of a supercritical fluid always sufficient to dissolve the desired compounds. When purifying polluted soil, the concentration of toxins may be too high even after extraction. The solvent power can be enhanced using different additives. When carbon dioxide is used, ethanol or methanol are common additives. Despite the use of additives, a satisfactory result is not always reached. As regulations for the protection of the atmosphere are globally getting tighter, new requirements are imposed on the quality of combustion engine fuels. Volatility and aromatics content are lowered, and lead-containing anti-knocking agents are phased out. As a consequence, the use of so-called alkylate fuel is rising. The term alkylate fuel refers to a hydrocarbon product normally produced by catalytic alkylation of isobutane with butene, propene or other olefins. A composition of branched hydrocarbons is thus produced, the octane number of which is above 90 without additives. Presently, sulfuric acid or hydrogen fluoride are used as catalysts, though research efforts are directed to the development of solid catalysts.

Above all the high cost of hydrogen fluoride and the high dryness requirements of the feed streams in processes utilizing it, processes catalysed by sulfuric acid are often preferred. The major drawback of these processes, however, lies in the regeneration of spent sulfuric acid. Worldwide use of sulfuric acid in the production of alkylated fuels comprises several million metric tons. The spent sulfuric acid consists of above 70%, normally at least 85–88% sulfuric acid into which a wide range of different organic compounds have dissolved. The composition of these compounds and the requirements as to the regeneration of the acid is strongly dependant on the impurities in the feed of the alkylation unit. The main impurity of the sulfuric acid bound for regeneration is so-called Red Oil, consisting mainly of long chain $C_{12}$–$C_{16}$ hydrocarbons, and organic compounds originating from olefins polymerizing due to the acid or reacting with alkylate molecules, the reaction of a feed impurity diene with an olefin, water or a hetero compound, and from the reactions between other impurities and olefins or sulfuric acid. Stable esters arising from ethene are particularly harmful components from a process point of view. Usually the process is operated at a sulfuric acid strength of about 90%, whereby the acid contains about 8% Red Oil and about 2% water. The regeneration of sulfuric acid is normally carried out by incineration at about 1200° C., whereupon the organic material is pyrolyzed. The generated sulfur trioxide is absorbed to produce new acid, which is recycled to the process at a concentration of about 98,5%, while a corresponding amount of diluted acid is withdrawn. Due to the high temperature incineration, the regeneration process is energetically disadvantageous. The adverse effects involved with the transport of spent sulfuric acid are obvious, and therefore the regeneration plant must often be situated in conjunction with the alkylation unit.

DETAILED DESCRIPTION OF THE INVENTION

According to the invented method, the organic compounds in the spent sulfuric acid from an alkylation process are extracted into supercritical or liquid carbon dioxide. Thus the high temperature incineration process is avoided, together with the aforementioned adverse effects associated therewith. In the manner characteristic for supercritical extraction, as disclosed above, the extracted material is easily separated from the extracting phase.

To our knowledge, no other regeneration methods for sulfuric acid contaminated with organic material than high temperature incinerations are employed, and the extraction of a phase mainly composed of sulfuric acid by means of supercritical fluid or liquid carbon dioxide has not, to our knowledge, been disclosed.

The extraction is carried out under conditions optimized according to the contaminants in the acid. The process may be batchwise or continuously operated; preferably it is continuous to serve a continuous alkylation process, producing sulfuric acid, the purity of which is adjusted to the economy and quality requirements of the process.

The equipment used may be of any type suitable for extraction with supercritical fluids, providing the materials are chosen for compatibilty with the acid and the impurities therein. Suitable equipment includes packed or plate columns, towers featuring perforated plates or baffle structures, mixer-settler type equipment equipped with internal mixing elements, and extraction devices utilizing centrifugal force.

In the following, the invention is illustrated by means of examples.

EXAMPLE 1

A test mixture was prepared to correspond to the material produced in an alkylation plant, according to the literature (1). The composition of the mixture in percent by weight was as follows:

| | |
|---|---|
| Sulfuric acid ($H_2SO_4$) | 88 |
| Dodecane | 4 |
| Hexadecane | 4 |
| Diethyl sulfate [$(C_2H_5)_2SO_4$] | 0.3 |

A batch extraction device was used, wherein the above mixture was extracted with supercritical carbon dioxide. The scale of the experiment was approximately 1 l. The pressure was raised from 100 bar to 200 bar during the experiment, and the temperature respectively from 35° C. to 55° C.

Subsequently the sulfuric acid was analysed by extracting with dichloromethane and performing a GC-MS analysis of the evaporation residue. According to the results, the efficiency of the supercritical extraction process was at least 85%.

EXAMPLE 2

Alkylation process spent sulfuric acid was synthesized by bubbling 2-cis-butadiene into 0.9 l 95–97% sulfuric acid. The sulfuric acid was cooled to +10° C. in a refrigerator prior to the bubbling, and throughout the procedure the temperature of the vessel was maintained at this level by cooling with an isopropanol-dry ice bath. Bubbling was continued during approx. 80 minutes. The sulfuric acid phase turned deep red during this period, which is in line with literature data describing the main impurity of the spent sulfuric acid as so-called Red Oil, consisting mainly of hydrocarbons with 12–16 carbons. The volume of the solution increased to about 1.05 l.

100 ml of this solution (Solution A) was diluted with water and neutralized with sodium bicarbonate. After salting out, the organic phase was separated and determined to represent about 5%.

Solution A was extracted by two procedures:

1. $CO_2$; p=200 bar; T=40° C.
2. $CO_2$; p=200 bar; T=30° C. (near-supercritical liquid)

The organic content of the extraction residues (solutions $B_1$, $B_2$) was determined in the same manner as that of Solution A. The concentrations were:

$B_1$:ca. 1%

$B_2$:ca. 1.4%

According to the results, the reduction of organic material in Solution $B_1$ was approx. 80%, and that in Solution $B_2$ was approx. 76%, relative to Solution A. The results show, that efficient purification of sulfuric acid is achieved already by single-stage extraction.

The technical arrangements described above are not to be understood as a limitation of the scope of the invention, but it is obvious that a person skilled in the art could achieve purification of sulfuric acid by other means within the field of supercritical extraction and liquid carbon dioxide technology.

LITERATURE (1) Corma, A., Martinez, A., *Chemistry, Catalysts and processes for Isoparaffin-Olefin Alkylation: Actual Situation and future trends*, Catal.Rev—Sci.Eng., 35(4) 485–570 (1993)

We claim:

1. A method for removal of organic impurities from a liquid phase by extraction using an extracting phase, wherein a sulfuric acid concentration of said liquid phase is at least about 70% by weight, and the extracting phase comprises carbon dioxide in a supercritical or liquid state.

2. A method according to claim 1, wherein said liquid phase contains sulfuric acid originating from a process for production of alkylated fuel.

3. A method according to claim 1, wherein said organic impurities consist essentially of hydrocarbons having 12 to 16 carbon atoms.

4. A method according to claim 1, wherein said supercritical or liquid carbon dioxide is modified by means of an additive.

5. A method according to claim 1, wherein said method is operated in a continuous manner.

6. A method according to claim 1, wherein said method is operated in a batchwise manner.

* * * * *